Figure 1:
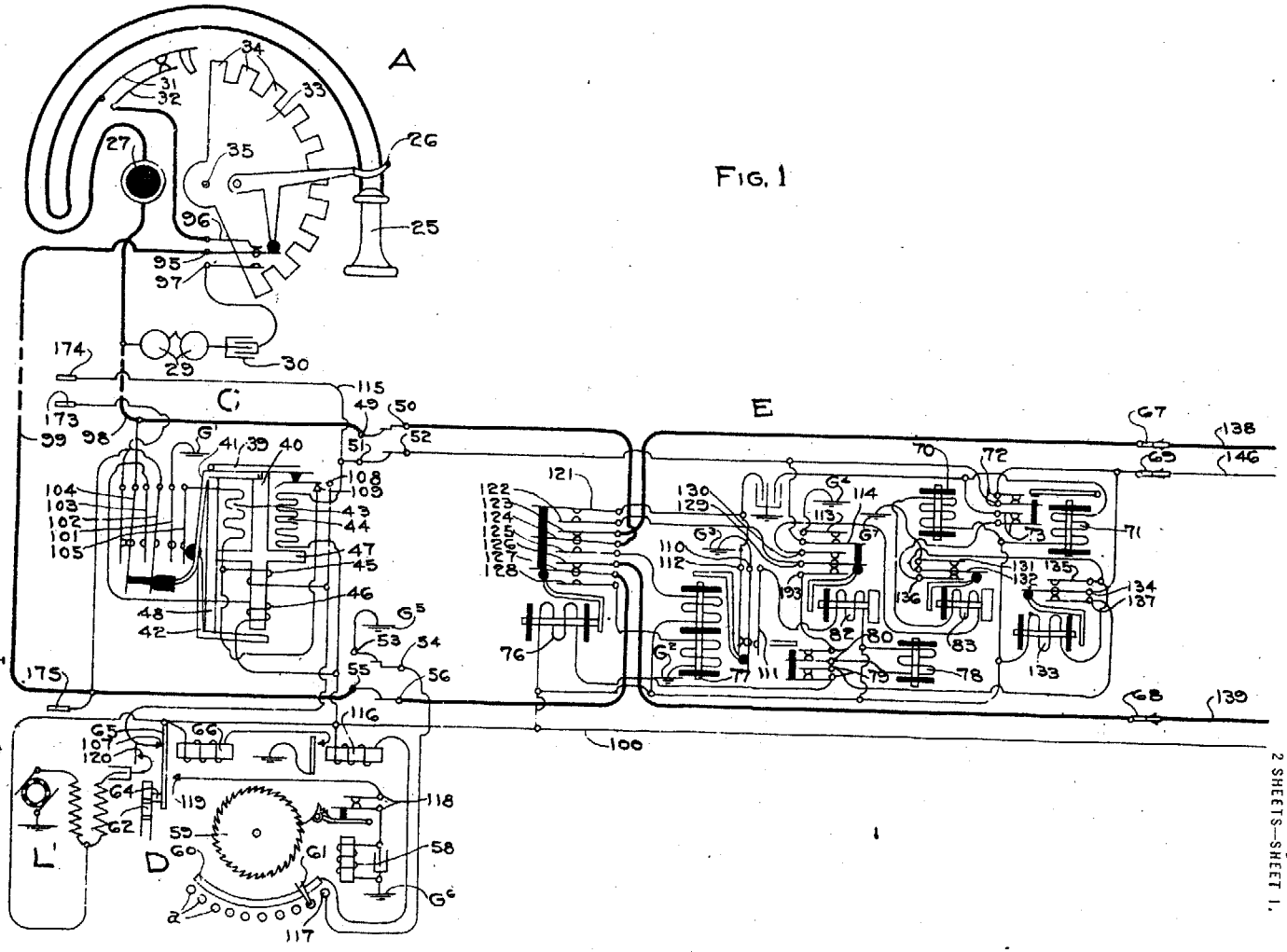

T. G. MARTIN.

AUTOMATIC TELEPHONE SWITCHING APPARATUS.

APPLICATION FILED SEPT. 11, 1918.

Reissued June 10, 1919.

14,665.

2 SHEETS—SHEET 1.

—Inventor—

Talbot G. Martin.

B. Yales Atty.

T. G. MARTIN.

AUTOMATIC TELEPHONE SWITCHING APPARATUS.

APPLICATION FILED SEPT. 11, 1918.

Reissued June 10, 1919.

14,665.

2 SHEETS—SHEET 2.

—Inventor—
Talbot G. Martin.
W. Fahr Atty.

UNITED STATES PATENT OFFICE.

TALBOT G. MARTIN, OF CHICAGO, ILLINOIS, ASSIGNOR TO AUTOMATIC ELECTRIC COMPANY, OF CHICAGO, ILLINOIS, A CORPORATION OF ILLINOIS.

AUTOMATIC TELEPHONE SWITCHING APPARATUS.

14,665. Specification of Reissued Letters Patent. Reissued June 10, 1919.

Original No. 1,221,346, dated April 3, 1917, Serial No. 624,568, filed May 2, 1911. Application for reissue filed September 11, 1918. Serial No. 253,512.

*To all whom it may concern:*

Be it known that I, TALBOT G. MARTIN, a citizen of the United States of America, and resident of Chicago, Cook county, Illinois, have invented a certain new and useful Improvement in Automatic Telephone Switching Apparatus, of which the following is a specification.

My invention relates to telephone systems in general, but more particularly to automatic or semi-automatic telephone exchange systems, and especially to systems of this kind in which the switches are controlled over the two sides of the line in series, or operated by controlling the two sides of the line in series, as distinguished from those systems in which the switches are controlled by grounding the line. It also relates to a system of this kind in which said switches have motion first in one direction to find a group, and then motion in another direction to find a terminal in the selected group. As is well known, and in a common form of system, the first motion is vertical and the second rotary. Systems of this kind in which the switches are controlled over metallic circuits are ordinarily known as two-wire systems.

Prior to my invention two-wire systems of this character have been provided with automatic switches, such, for example, as the well-known first and second selectors, but in most cases these selectors were provided with the usual and well-known side switch. These side switches were in the nature of auxiliary switches for controlling the continuity of connection between the selectors and the trunks leading thereto, and for controlling certain local circuits. Each side switch, in the well-known form of automatic switch of this character, was provided with three positions, whereby the selector was incapable of extending connection over a trunk line until after the side switch thereof had reached the third position. The arms or movable contacts of the selector would engage with the terminals of the selected trunk line, but it was necessary for the side switch to then pass from second to third position in order to connect the said arms with the trunk leading to the selector, and to thereby complete the connection to the selected trunk line. These so-called side switches are somewhat complicated, and in some ways are objectionable.

The object of my invention is, therefore, to provide a two-wire automatic or semi-automatic telephone exchange system of the foregoing general character in which automatic switches, such, for example, as the first and second selectors thereof, are constructed to operate without side switches, ordinary relays being substituted therefor, whereby the objection to these side switches are eliminated, the work ordinarily performed thereby being taken care of by the said relays, which are, of course, much more simple in form and construction.

To these and other useful ends my invention consists in matters hereinafter set forth and claimed.

Figure 2:
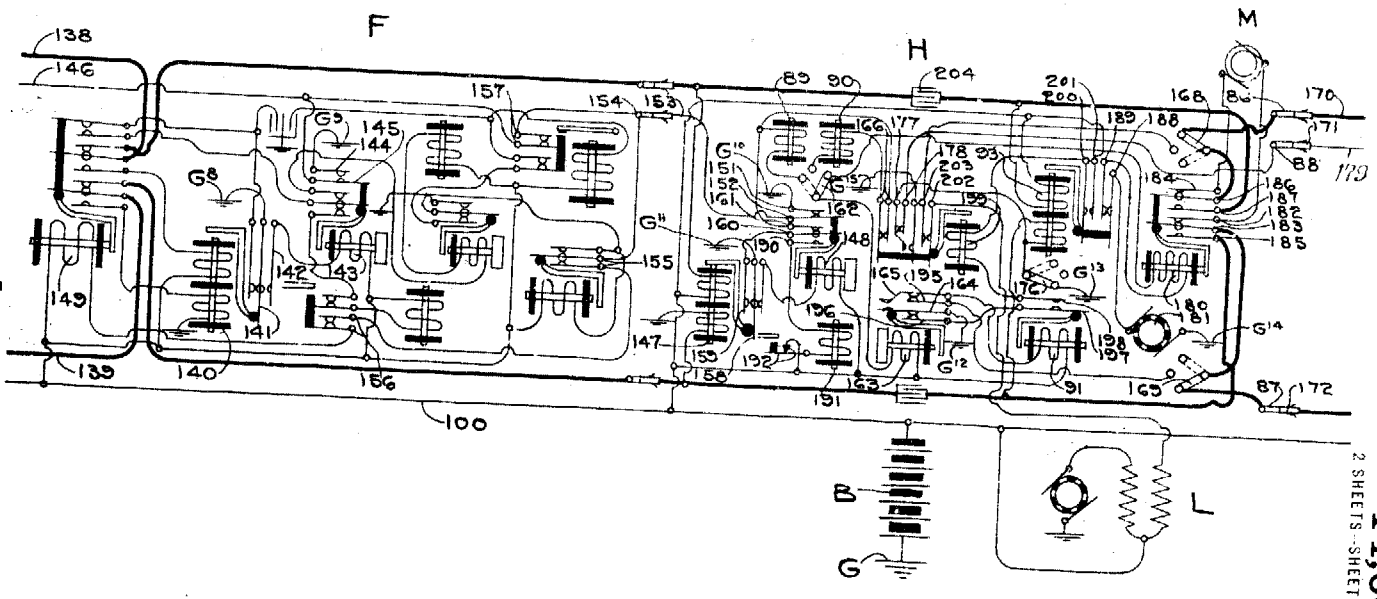

In the accompanying drawings, Figures 1 and 2 show a complete connection between a calling substantion A (Fig. 1) and a called line (Fig. 2) in a system embodying the principles of my invention. In Fig. 1 there is represented an automatic substation A to the line conductors of which there is allotted at the central office an individual or line switch C. At D there is shown a master switch for controlling a group of line switches C. The line switches of this group have common access to a number of trunk lines which lead to first selector switches E. A number of first selectors have common access to a number of second selectors F (Fig. 2), which in turn have access to connector switches H, by means of which connection may be completed with subscribers' lines. Associated with the connector H there are shown a ringing current generator M and a busy signaling apparatus L. At B a battery is shown having one terminal grounded.

The substation A may be of any suitable common battery automatic type. As shown herein, it comprises the usual receiver 25, switch hook 26, transmitter 27, ringer 29 and condenser 30. Being an automatic substation it is also provided with the impulse springs 31 and 32 and an impulse wheel 33. The impulse wheel 33 carries upon its periphery the impulse teeth 34 and is secured to a shaft 35, to which there is also attached a dial (not shown) provided with finger holes, through the medium of which the impulse wheel may be rotated. As the impulse wheel is returned to normal position by a spring (not shown) after it has been rotated for any digit, each of the teeth 34 which passes the end of the spring 31 forces said spring out of engagement with the spring 32. The number of times these springs are separated depends upon the digit called.

The line switch C, which is individual to the line of substation A, and the master switch D are modified forms of the general type of line switch and master switch disclosed in British Patent No. 26,301 of 1906, being of the particular type shown in British Patent No. 1419 of 1910. As herein represented, the line switch C comprises, among other details, a plunger (not shown) attached to the end of a so-called plunger arm 39 which is controlled by the magnet 40. The magnet 40 also controls the relay armatures 41 and 42 and is composed of four-windings, namely, a pull-in winding 43, a holding or cut-off winding 44, a line winding 46 and an auxiliary winding 45. The core of the magnet is provided near the center of its length with a lateral projection 47 by means of which the magnet is mounted upon the bracket 48, upon which latter the armatures 39, 41 and 42 are pivoted. With this method of mounting the magnet the magnetic circuit of the windings 43 and 44 is maintained separate from that of the windings 45 and 46, so that the armatures at one end of the magnet are not affected by the energization of the windings upon the other end of the magnet, only the winding 43 being strong enough to attract the plunger arm 39 from its normal position. The winding 44 is not strong enough to thus operate the plunger arm, but will hold it in an operated position after it has been drawn down by the winding 43. When the plunger arm 39 is attracted by the magnet 40, the plunger of the switch is forced into a bank of contact springs, forcing the springs 49, 51, 53 and 55 into engagement with the springs 50, 52, 54 and 56, respectively. Although only one set of springs (49—56) is shown, each line switch C is provided with a number of such groups of springs, each group forming the terminal of a trunk line leading to a selector E. Each trunk line is multipled through the corresponding springs of all the line switches of the group which is controlled by the master switch D.

The plungers of the line switches normally engage a so-called plunger shaft (not shown) and, through the medium of the master switch D, are normally maintained opposite the terminals of an idle trunk line. The master switch consists essentially of a motor magnet 58 for rotating the ratchet wheel 59. The ratchet wheel 59 is connected with the plunger shaft in such a manner that a rotary motion of the wheel imparts an oscillatory motion to the plunger shaft to move the plungers back and forth in front of the trunk terminals. To the plunger shaft there is also secured a locking plate 62 provided near its outer edge with a number of openings adapted to be engaged by the pin 64 upon the end of the armature 65. The holes in this plate are so spaced that the pin 64 can engage one of them and allow the armature to drop back only when the idle plungers are directly opposite a trunk terminal. The master switch is also provided with a bank of contacts comprising a common segment 60 and one individual segment *a* for each trunk to which the switches C have access. The wiper 61 always keeps the common segment in electrical connection with the individual contact of the trunk line before which the idle plungers are resting.

The selector E is of the general type of selector disclosed in United States Letters Patent No. 815,321, granted to Keith, Erickson & Erickson March 13, 1906, but has no side switch. Among other details, the selector E comprises a set of wipers 67, 68 and 69 carried upon a vertically and rotatably movable shaft (not shown). The vertical movement is controlled by the vertical magnet 70, and the rotary movement is governed by the rotary magnet 71. The usual vertical and rotary line relays are replaced by the double-wound line relay 77, which is normally connected to the line through the springs of a cut-off relay 76. Means for permitting the switch to be restored to normal position are provided in the release magnet 78 which, upon energizing, withdraws the retaining pawls from the shaft. The springs 79 and 80 are permitted to close only when the switch shaft has been raised one or more steps from the lowest position. The pairs of springs 72 and 73 are separated by the armature of the rotary magnet just before it reaches the end of the stroke. The relays 82 and 83 are slow acting relays, *i. e.*, slow to deënergize after their circuits are broken. This slow action is usually accomplished by placing a ring of copper around one end of the core of the relay magnet. The selector F is in all respects the same as the selector E.

The connector H is of the general type of connector switch disclosed in United States Letters Patent #815,176, granted March 13, 1906, to Keith, Erickson & Erickson, but, like the selectors is modified in order to operate in a two-wire system. Like the selectors, the connector is provided with a shaft (not shown) carrying the wipers 86, 87 and 88, and is controlled by the vertical magnet 89 and rotary magnet 90. The usual side switch is controlled by the private magnet 91 in the usual manner. The connector is provided with a so-called back bridge relay 93 through which the called substation is provided with talking battery current, and with a ringer relay through the medium of which ringing current may be applied to the called line after connection is completed therewith.

Having given a general description of the apparatus, I will now explain in detail the operations by which one subscriber establishes connection with another in a system embodying the principles of my invention. It will be explained how substation A may obtain connection with line number 2220. When the calling subscriber removes his receiver preparatory to making a call, the switch hook rises, permitting the spring 95 to pass out of engagement with spring 97 and into contact with spring 96, whereby the circuit of the ringer 29 and condenser 30 is broken, and a bridge consisting of the substation transmitter and receiver is closed across the line conductors 98 and 99. The closure of this bridge across the line completes an energizing circuit through the line winding 46 of the switch C. This circuit extends from ground G′ through springs 101 and 102, line 99, springs 95 and 96, receiver 25, impulse springs 31 and 32, transmitter 27, line 98, springs 104 and 103, and winding 46 to battery lead 100. The energization of the winding 46 serves to attract the armature 42, which operates to force the spring 105 into engagement with spring 101, thereby a circuit is closed through the pull-in winding 43. This circuit extends from ground G′ through springs 101 and 105, winding 43 and 45, contact point 107 and armature 65 to battery lead 100. The winding 43, upon energizing, attracts the armature 41 and plunger arm 39. The armature 41, upon being attracted, operates to disconnect the line winding 46 and ground G′ from the calling line. The armature 42 does not fall back immediately upon the deënergization of the winding 46, but remains held by the current flowing in the winding 45 until the plunger arm 39 forces spring 108 into contact with spring 109, whereby the winding 45 is short-circuited and consequently deënergizes slowly to hold the armature 42 in its operated position for an instant longer. Before the armature 42 is restored sufficiently to break the circuit of the winding 43, a circuit is closed through the winding 44 in the following manner: When the springs 49 and 55 are forced into contact with springs 50 and 56, respectively, by the plunger of the line switch C, a circuit is closed through the line relay 77 of the selector E. This circuit extends from ground $G^2$ through the lower winding of relay 77, springs 128 and 127, springs 56 and 55, thence over the heavy conductors to and through substation A and back over the other side of the line, and through the upper winding of the relay 77 to the battery lead 100. The relay 77, upon energizing, operates to close a circuit through the relay 82, said circuit extending from ground $G^3$ through the springs 110 and 111 and relay 82 to battery lead 100. The relay 82, upon energizing, operates to close the circuit of the holding winding 44 of the line switch C, said circuit extending from ground $G^4$ through the springs 113 and 114, 52 and 51 and winding 44 to battery lead 100. The current in this winding serves to hold the plunger arm 39 and armature 41 in their operated positions after the winding 43 has been deënergized. The energization of the relay 82, of the selector E also extends a guarding potential from ground $G^4$ over conductor 115 to the connector private bank contacts of the calling line.

When the springs 53 and 54 are forced into contact by the plunger of the line switch, a circuit is closed through the master switch relay 116. This circuit extends from ground $G^5$ through the springs 53 and 54, contact point 117, wiper 61, segment 60 and relay 116 to battery lead 100. The relay 116, upon energizing, operates to close a circuit through the relay 66. The relay 66, upon energizing, operates to withdraw the pin 64 from the plate 62 and to close the circuit of the motor magnet 58. This circuit extends from ground $G^6$ through the magnet 58, interrupter springs 118, contact point 119 and armature 65 to battery lead 100. As long as the armature 65 engages contact point 119, the magnet 58 operates in a manner similar to that of a buzzer to rotate the ratchet wheel 59 step by step to advance the idle line switch plungers away from the trunk just seized. After the plungers have been advanced a short distance, the wiper 61 passes off the contact point 117 and allows the relays 116 and 66 to deënergize. The armature 65 does not fall back immediately upon the deënergization of relay 66, but remains in contact with contact point 119 until the next opening in the plate 62 passes under the pin 64. When the next opening does pass under the pin 64 the armature 65 falls back, forcing the pin into this opening to lock the plunger shaft and breaking the circuit of the motor magnet 58. The foregoing is the operation of the master switch in case the next trunk line after the one seized by the switch C is idle. If, however, this next trunk is busy, the wiper 66 finds the corresponding contact in the master switch bank grounded, and consequently the relays 116 and 66 remain energized while the next opening is passing under the pin 64 and the plungers are carried past the busy trunk to an idle one. As long as the master switch is operating, the armature 65 is disengaged from the spring 107 and the spring 107 engages the spring 120, whereby the pull-in windings of all the idle line switches are disconnected from the battery and connected to the busy signaling machine L′. With this arrangement no line switch can be operated while its plunger is being moved from one trunk to another, and any subscriber who attempts to make a call at that time will receive the busy signal, due to the inductive relation between the line winding 46 and the winding 45, which is then connected to the busy signaling machine L′.

The foregoing operations take place immediately upon the removal of the receiver at the calling substation. The calling subscriber now operates his dial for the first digit 2 of the desired number. As the impulse wheel 33 returns to normal position after being rotated for this digit, the impulse springs 31 and 32 are separated twice momentarily. Each time the springs 31 and 32 are separated, the line relay 77 of the selector deënergizes. Since the relay 82 is slow acting it does not have time to deenergize during the momentary interruption of its circuit at the springs 110 and 111. Consequently, the engagement of the springs 110 and 112 closes an energizing circuit through the vertical magnet 70. This circuit extends from ground $G^3$ through the springs 110 and 112, 121 and 122, 129 and 130, relay 83 and magnet 70 to battery. The vertical magnet receives two impulses over this circuit and operates to raise the switch shaft and wipers two steps to a position opposite the second row or level of bank contacts. The relay 83 is energized in series with the vertical magnet but, being slow acting, does not have time to deënergize between impulses. The relay 83, upon energizing, closes a circuit from ground $G^7$ through the springs 131 and 132 and the relay 133 to battery. The relay 133, upon energizing, completes a locking circuit for itself extending from ground $G^4$ through the springs 113 and 114, 72, 134 and 135 and the winding of said relay to battery. As a result of the closure of this locking circuit, the relay 133 remains energized after the relay 83 deënergizes upon the completion of the impulses for the first digit 2. The relay 83, therefore, upon deënergizing, completes a circuit from ground $G^4$ through the springs 113 and 114, 72, 134 and 135, 132 and 136, 73 and the rotary magnet 71 to battery. The rotary magnet 71, upon energizing, rotates the wipers one step, and by separating the springs 72 and 73 disconects the ground $G^4$ from the magnet 71 and the relay 133. If the first trunk line of the second level is idle, the relay 133 deënergizes as soon as the springs 72 are separated. If this trunk is busy, however, the private wiper 69 finds the contact which it engages grounded and therefore prevents the relay 133 from deënergizing. The magnet 71, however, deënergizes as soon as the springs 73 are separated, regardless of whether the relay 133 remains energized or not. If the relay 133 remains energized, the circuit of the rotary magnet is again closed as soon as its armature drops back far enough to permit the springs 73 to engage. Upon energizing the second time the rotary magnet advances the wipers a second step. The rotary magnet continues to advance the wipers step by step in this manner until the wiper 69 engages the non-grounded contact of an idle trunk, whereupon the relay 133 deënergizes. When the relay 133 deënergizes, whether after one or several operations of the rotary magnet, the separation of its springs 134 and 135 permanently opens the circuit of the rotary magnet to prevent its further operation. The deënergization of the relay 133 also completes a circuit from ground $G^4$ through the springs 113 and 114, 72, 134 and 137 and 79 and the relay 76 to battery. The relay 76, upon energizing, disconnects the line relay 77 from the line and extends the connection from the calling line over the heavy conductors through the wipers 67 and 68 to the trunk conductors 138 and 139 which lead to the selector F (Fig. 2). When this occurs the line relay 140 of the selector F becomes energized in the same manner in which the relay 77 of the selector E was first energized. The relay 140, upon energizing, closes a circuit from ground $G^8$ through the springs 141 and 142 and relay 143 to battery. The relay 143, upon energizing, closes a circuit from ground $G^9$ through the springs 144 and 145, conductor 146, private wiper 69 of selector E, springs 134, 137 and 79 and relay 76 to battery. This circuit maintains the relay 76 energized after the ground $G^4$ is disconnected by the relay 82, which deënergizes shortly after relay 77 is cut from the line. The relay 143 of the selector F also extends a guarding potential from ground $G^9$ over the conductor 146 to the private bank contacts of the trunk selected by the selector E, to prevent the said trunk from seizure by a second switch, and provides a holding circuit for the winding 44 of the line switch C.

When the substation calling device is operated for the second digit, the selector F operates in the same manner as explained for the selector E to extend the connection to the connector H. The line relay 147 of the connector is energized as soon as connection is extended thereto and operates to close a circuit through the relay 148. The relay 148, upon energizing, supplies a new guarding potential for the trunks seized by the selectors E and F, and a new holding circuit for the relays 149 and 76 of the selectors E and F and the winding 44 of the line switch C. This circuit extends from ground $G^{10}$ through the springs 151 and 152, conductor 153 and private bank contacts of the trunk leading to connector H to wiper 154. From the wiper 154 one branch of the circuit passes through the springs 155 and 156 and relay 149 to the battery, while another branch passes through the springs 157 to conductor 146 and thence through wiper 69 to the relay 76 of the selector E and the winding 44 of the switch C.

When the substation calling device is operated for the third digit 2, the relay 147 of the connector is deënergized twice. Since the relay 148 is slow acting it does not deenergize between impulses, and each time the relay 147 deënergizes a circuit is closed from ground $G^{11}$ through the springs 158 and 159, 160 and 161, vertical magnet 89, side switch wiper 162 and relay 163 to battery. The vertical magnet 89 is operated twice over this circuit to raise the shaft wipers two steps. The relay 163 is energized in series with the vertical magnet and closes a circuit from ground $G^{12}$ through the springs 164 and 165 and the private magnet 91 to the battery B. After the last impulse is delivered to the vertical magnet, the slow acting relay 163 deënergizes and opens the circuit of the private magnet. The private magnet, upon deenergizing, permits the side switch to pass from first to second position. When the substation calling device is operated for the last digit 0, the line relay of the connector deenergizes ten times, each time closing a circuit from ground $G^{11}$ through the springs 158 and 159, 160 and 161 and 166, rotary magnet 90, side switch wiper 162 (in second position) and relay 163 to battery. The relay 163 operates in response to this series of impulses in the same manner as for the previous series to cause the private magnet 91 to trip the side switch to third position after the last impulse is delivered. The movement of the side switch wipers 168 and 169 to third position completes the connection from the calling line through the wipers 86 and 87 to the called line to which the wipers have been rotated by the ten steps of the rotary magnet. It will be understood, of course, that the contacts 170, 171 and 172 bear the same relation to the called line that the contacts 173, 174 and 175 (Fig. 1), respectively, bear to the calling line. The engagement of the side switch wiper 176 with its third-position contact point supplies a guarding potential from ground $G^{13}$ through the springs 177 and 178 and private wiper 88 to the private bank contact 171 and the corresponding contact in the banks of all the connectors which have access to the line called. From the contact 171 a circuit extends over the conductor 179 and through the cut-off winding of the line switch of the called line to battery. (See the contact 174 and winding 44 of the calling line.) The cut-off winding of the called line, upon energizing, attracts the cut-off armature, which disconnects the line switch from the line. The engagement of the side switch wiper 162 with its third position contact point completes a circuit for the ringing relay 180, which circuit extends from ground $G^{14}$ through the interrupter 181, springs 188 and 189, relay 180, side switch wiper 162 and relay 163 to battery. The relay 180 is energized intermittently over this circuit by means of the interrupter 181 and operates to complete a circuit from one terminal of the generator M through the springs 182 and 183, wipers 169 and 87, thence to and through the bells at the called substation and back over the other side of the line, and through wipers 86 and 168 and springs 186 and 184 to the other terminal of the generator. When the called subscriber removes his receiver, his talking circuit is bridged across the line and, as soon thereafter as the ringing relay 180 deënergizes, the called telephone is provided with talking current over a circuit extending from ground $G^{13}$ through the side switch wiper 176, lower winding of relay 93, springs 185 and 183, wipers 169 and 87, called telephone, wipers 86 and 168, springs 186 and 187 and upper winding of relay 93 to battery. The relay 93, upon energizing, opens the circuit of the ringing relay at the springs 188 and 189, and the two connected subscribers may carry on an uninterrupted conversation over the circuit indicated by heavy conductors in the drawings.

After a conversation is completed the central office switches are released by the hanging up of the receiver at the calling substation. When the relay 147 of the connector deënergizes, upon the hanging up of the receiver, it breaks the circuit of the relay 148. The relay 148, upon deënergizing, closes a circuit from ground $G^{11}$ through the springs 158 and 159, 160 and 190, release magnet 191 and off-normal springs 192 to battery. When the magnet 191 energizes it withdraws the retaining pawls from the connector shaft and restores the side switch. When the shaft reaches its lowest position it opens the circuit of the magnet 191.

The deënergization of the relay 148 at the connector also breaks the holding circuits of the winding 44 of the line switch C and of relays 76 and 149 of the selectors E and F. The winding 44, upon deënergizing, permits the plunger of the line switch to be restored. The deënergization of the relay 76 closes a circuit from ground $G^3$ through springs 110 and 112, 121 and 122, 129 and 193 and 80 and magnet 78 to battery. The magnet 78, upon energizing, withdraws the pawls from the shaft. When the shaft reaches its lowest position it opens springs 79 and 80, allowing the magnet 78 to deënergize, and disconnecting the relay 76 from the spring 114 of the relay 82. The switch F is released in the same manner by the deënergization of the relay 149.

If the called line had been busy when the connector H sought to make connection therewith, the connection would not have been completed and the calling subscriber would have been given a busy signal. If the called line had been busy the private wiper 88 would have been standing on a grounded contact when the relay 163 deënergized after the last digit was called, and consequently the private magnet 91 would not have deënergized to permit the side switch to pass to third position, but would have been locked up over a circuit extending from the guarded private bank contact of the busy called line, over the wiper 88, springs 178 and 177, lower winding of the relay 93, springs 185 and 183, side switch wiper 169 (in second position), springs 195 and 165 and magnet 91 to battery. The relay 93 would have been energized over the circuit just traced and aided in closing a circuit from ground $G^{12}$ through the springs 164 and 196, 197 and 198, relay 199 and springs 200 and 201 to battery. The relay 199, upon energizing, would have shifted the holding ground for the private magnet from the private wiper to ground $G^{15}$, and the side switch would have remained locked in second position until the calling subscriber hung up his receiver. The engagement of the springs 202 and 203 of the relay 199 would have connected the busy signal machine L with the calling line through the side switch wiper 168, ringer relay springs 186 and 187 and condenser 204. The return path for the busy signal current would be from the calling line through the lower winding of the connector line relay 147 to ground, thence through the battery B back to the machine L.

From the foregoing it will be seen that I provide a very simple and highly efficient two-wire system some of the switches of which are of the side switchless type. In other words, and notwithstanding that the system includes automatic switches which are controlled over the two sides of the line in series, no side switches are employed for the automatic selectors, relays of a very simple form and construction being used instead. One relay of each selector is adapted by a single movement of its armature to connect the trunk with line wipers or movable arms of the selector. As shown, the line wipers or movable arms of the first selector are normally disconnected from the trunk leading to said selector. This is also true of the second selector, as the contacts of the relay are normally open. Furthermore, it will be seen that side switches are not necessary for controlling the local circuits of the switch. Relays are used for this purpose as well, which relays are all in normal position during the time that the selector is in use for talking purposes. In this way the local circuit of the rotary magnet of the selector is in normal condition while the selector is in operative position. In the old construction, however, the side switch remained in third position during conversation between the two subscribers, and did not return to normal position until the connection was released. With my improved arrangement, as stated, the local circuit of the rotary magnet, and the relay contacts controlling said circuit, are all in normal condition during the time that the selector is in operated position—that is to say, during the time that it is in off normal position to maintain the continuity of the talking circuit. Again, it will be seen that the operation of the rotary magnet, with my improved arrangement, is started by the closing of normally closed contacts, which contacts are open during the vertical motion of the selector. Moreover, my invention not only involves the use of one relay for starting the operation of the rotary magnet, but also involves the use of another relay for stopping the operation of said magnet. Thus, as explained, nothing but simple relay contacts are employed for controlling the entire operation of the selector. In this way practically the utmost simplicity of construction is insured, and the selectors are made reliable and serviceable in use.

What I claim as my invention is:

1. In a telephone system, an automatic switch having bank terminals divided into groups, the groups being disposed in parallel planes, movable arms having motion in one direction to find a group and motion in another direction to find a terminal in the selected group, a line relay for controlling the operation of said arms, an electromagnet, a trunk adapted by a single movement of the armature of said magnet to be connected with said arms, means for controlling the two sides of said trunk in series to control said relay, a local circuit governing the said second motion, normally closed contacts in said local circuit, which contacts are open during the said first motion, and means whereby said contacts are then closed to start the second motion.

2. In a telephone system, an automatic switch having bank terminals divided into groups, the groups being disposed in parallel planes, movable arms having motion in one direction to find a group and motion in another direction to find a terminal in the selected group, an electromagnet for producing the first motion, an electromagnet for producing the second motion, a relay, a line adapted by a single movement of the armature of said relay to be connected with said arms, means for controlling the two sides of said line in series to control one of said magnets, a local circuit governing the said second motion, normally closed contacts in said local circuit, which contacts are open during the said first motion, and means whereby said contacts are then closed to start the second motion.

3. In a telephone system, an automatic switch having bank terminals divided into groups, the groups being disposed in parallel planes, movable arms having motion in one direction to find a group and motion in another direction to find a terminal in the selected group, electromagnet mechanism for producing said first and second motions, a relay, a trunk normally disconnected from said arms, adapted by a single movement of the armature of said relay to be connected with said arms, means for controlling the two sides of said trunk in series to control said relay, a local circuit governing the said second motion, normally closed contacts in said local circuit, which contacts are open during the said first motion, and means whereby said contacts are then closed to start the second motion.

4. In a telephone system, an automatic switch having bank terminals divided into groups, the groups being disposed in parallel planes, movable arms having motion in one direction to find a group and motion in another direction to find a terminal in the selected group, a line relay for controlling the operation of said arms, an electromagnet, a trunk adapted by a single movement of the armature of said magnet to be connected with said arms, means for controlling the two sides of said trunk in series to control said relay, a local circuit governing the said second motion, contacts in said local circuit, which contacts are open during the said first motion, means whereby said contacts are automatically closed upon the cessation of the first motion to start the second motion, other contacts in said local circuit, and means whereby said other contacts are automatically opened to stop said second motion when the said terminal is found.

5. In a telephone system, an automatic switch having bank terminals divided into groups, the groups being disposed in parallel planes, movable arms having motion in one direction to find a group, and motion in another direction to find a terminal in the selected group, an electromagnet for producing the first motion, an electromagnet for producing the second motion, a relay, a line adapted by a single movement of the armature of said relay to be connected with said arms, means for controlling the two sides of said line in series to control one of said magnets, a local circuit governing the said second motion, contacts in said local circuit, which contacts are open during the said first motion, means whereby said contacts are automatically closed upon the cessation of the first motion to start the second motion, other contacts in said local circuit, and means whereby said other contacts are automatically opened to stop said second motion when the said terminal is found.

6. In a telephone system, an automatic switch having bank terminals divided into groups, the groups being disposed in parallel planes, movable arms having motion in one direction to find a group and motion in another direction to find a terminal in the selected group, electromagnet mechanism for producing said first and second motions, a relay, a trunk normally disconnected from said arms, adapted by a single movement of the armature of said relay to be connected with said arms, means for controlling the two sides of said trunk in series to control said relay, a local circuit governing the said second motion, contacts in said local circuit, which contacts are open during the said first motion, means whereby said contacts are automatically closed upon the cessation of the first motion to start the second motion, other contacts in said local circuit, and means whereby said other contacts are automatically opened to stop said second motion when the said terminal is found.

7. In a telephone system, an automatic switch having bank terminals divided into groups, the groups being disposed in parallel planes, movable arms having motion in one direction to find a group and motion in another direction to find a terminal in the selected group, a line relay for controlling the operation of said arms, an electromagnet, a trunk adapted by a single movement of the armature of said magnet to be connected with said arms, means for controlling the two sides of said trunk in series to control said relay, normally closed circuit contacts in the switch for starting the said second motion, which contacts are open during the said first motion, and means whereby said contacts are then automatically closed to start the second motion.

8. In a telephone system, an automatic switch having bank terminals divided into groups, the groups being disposed in parallel planes, movable arms having motion in one direction to find a group and motion in another direction to find a terminal in the selected group, an electromagnet for producing the first motion, an electromagnet for producing the second motion, a relay, a line adapted by a single movement of the armature of said relay to be connected with said arms, means for controlling the two sides of said line in series to control one of said magnets, normally closed circuit contacts in the switch for starting the said second motion, which contacts are open during the said first motion, and means whereby said contacts are then automatically closed to start the second motion.

9. In a telephone system, an automatic switch having bank terminals divided into groups, the groups being disposed in parallel planes, movable arms having motion in one direction to find a group and motion in another direction to find a terminal in the selected group, electromagnet mechanism for producing said first and second motions, a relay, a trunk normally disconnected from said arms, adapted by a single movement of the armature of said relay to be connected with said arms, means for controlling the two sides of said trunk in series to control said relay, normally closed circuit contacts in the switch for starting the said second motion, which contacts are open during the said first motion, and means whereby said contacts are then automatically closed to start the second motion.

10. In a telephone system, an automatic switch having bank terminals divided into groups, the groups being disposed in parallel planes, movable arms having motion in one direction to find a group and motion in another direction to find a terminal in the selected group, a line relay for controlling the operation of said arms, an electromagnet, a trunk adapted by a single movement of the armature of said magnet to be connected with said arms, means for controlling the two sides of said trunk in series to control said relay, circuit contacts in the switch for starting the said second motion, other circuit contacts in the switch, and means for opening said other contacts, when the said terminal is found, to prevent further motion of the switch.

11. In a telephone system, an automatic switch having bank terminals divided into groups, the groups being disposed in parallel planes, movable arms having motion in one direction to find a group and motion in another direction to find a terminal in the selected group, an electromagnet for producing the first motion, an electromagnet for producing the second motion, a relay, a line adapted by a single movement of the armature of said relay to be connected with said arms, means for controlling the two sides of said line in series to control one of said magnets, circuit contacts in the switch for starting the said second motion, other circuit contacts in the switch, and means for opening said other contacts, when the said terminal is found, to prevent further motion of the switch.

12. In a telephone system, an automatic switch having bank terminals divided into groups, the groups being disposed in parallel planes, movable arms having motion in one direction to find a group and motion in another direction to find a terminal in the selected group, electromagnet mechanism for producing said first and second motions, a relay, a trunk normally disconnected from said arms, adapted by a single movement of the armature of said relay to be connected with said arms, means for controlling the two sides of said trunk in series to control said relay, circuit contacts in the switch for starting the said second motion, other circuit contacts in the switch, and means for opening said other contacts, when the said terminal is found, to prevent further motion of the switch.

13. In a telephone system, an automatic switch having bank terminals divided into groups, the groups being disposed in parallel planes, movable arms having motion in one direction to find a group and motion in another direction to find a terminal in the selected group, a line relay for controlling the operation of said arms, an electromagnet, a trunk adapted to be connected with said arms, means for controlling the two sides of said trunk in series to control said relay, a local circuit governing the said second motion, normally closed contacts in said local circuit, which contacts are open during the said first motion, and means whereby said contacts are then closed to start the second motion.

14. In a telephone system, an automatic switch having bank terminals divided into groups, the groups being disposed in parallel planes, movable arms having motion in one direction to find a group and motion in another direction to find a terminal in the selected group, an electromagnet for producing the first motion, an electromagnet for producing the second motion, a relay, a line adapted to be conneted with said arms, means for controlling the two sides of said line in series to control one of said magnets, a local circuit governing the said second motion, normally closed contacts in said local circuit, which contacts are open during the said first motion, and means whereby said contacts are then closed to start the second motion.

15. In a telephone system, an automatic switch having bank terminals divided into groups, the groups being disposed in parallel planes, movable arms having motion in one direction to find a group and motion in another direction to find a terminal in the selected group, electromagnet mechanism for producing said first and second motions, a relay, a trunk normally disconnected from said arms adapted to be connected with said arms, means for controlling the two sides of said trunk in series to control said relay, a local circuit governing the said second motion, normally closed contacts in said local circuit, which contacts are open during the first said motion, and means whereby said contacts are then closed to start the second motion.

16. In a telephone system, a vertical and rotary motion switch, a magnet for operating said switch in its rotary motion, a circuit for said magnet, a relay directly controlling said circuit for starting the rotary motion, another relay directly controlling said circuit for stopping said rotary motion, a line, and means for controlling the two sides of the line in series to control the switch.

17. In a telephone system, a vertical and rotary motion switch, electromagnet mechanism in the switch for producing said motion, relay mechanism in the switch for controlling said electromagnet mechanism, a line, and means for controlling the two sides of said line in series to control said relay mechanism, said electromagnet mechanism having a local circuit that is in normal condition while the switch is in operated position.

18. In a telephone system, a vertical and rotary motion switch, having an operating magnet the circuit of which is in normal condition while the switch is in operated position, a line, and means for controlling the two sides of said line in series to control said switch.

19. In a telephone system, an automatic switch having bank terminals divided into groups, the groups being disposed in parallel planes, movable arms having motion in one direction to find a group and motion in another direction to find a terminal in the selected group, a line relay for controlling the operation of said arms, an electromagnet, a trunk, means controlled by a single movement of the armature of said magnet to connect said trunk with said arms, means for controlling the two sides of said trunk in series to control said relay, a local circuit governing the said second motion, normally closed contacts in said local circuit, which contacts are open during the said first motion, means whereby said contacts are then closed to start the second motion, a third arm, release mechanism for said switch, and release circuits therefor including contacts of said bank and said third arm.

20. In a telephone system, an automatic switch having bank terminals divided into groups, the groups being disposed in parallel planes, movable arms having motion in one direction to find a group and motion in another direction to find a terminal in the selected group, an electromagnet for producing the first motion, an electromagnet for producing the second motion, a relay, a line, means controlled by a simple movement of the armature of said relay to connect said line with said arms, means for controlling the two sides of said line in series to control one of said magnets, a local circuit governing the said second motion, normally closed contacts in said local circuit, which contacts are open during the said first motion, means whereby said contacts are then closed to start the second motion, a third arm, release mechanism for said switch, and release circuits therefor including contacts of said bank and said third arm.

21. In a telephone system, an automatic switch having bank terminals divided into groups, the groups being disposed in parallel planes, movable arms having motion in one direction to find a group and motion in another direction to find a terminal in the selected group, electromagnet mechanism for producing said first and second motions, a relay, a trunk normally disconnected from said arms, means controlled by a single movement of the armature of said relay to connect said trunk with said arms, means for controlling the two sides of said trunk in series to control said relay, a local circuit governing the said second motion, normally closed contacts in said local circuit, which contacts are open during the said first motion, means whereby said contacts are then closed to start the second motion, a third arm, release mechanism for said switch, and release circuits therefor including contacts of said bank, and said third arm.

22. In a telephone system, a switch having vertical and rotary motions, a line relay for controlling said switch, an operating magnet controlling the rotary motion of said switch, an energizing circuit for said magnet, a pair of relays controlling said energizing circuit, one of said relays adapted to be energized in order to energize the second of said relays, and means for closing said energizing circuit for said operating magnet by having said secondary relay energized while said first relay is deënergized.

23. In a telephone system, a vertical and rotary motion switch, a vertical operating magnet, a rotary operating magnet, a slow acting relay connected in series with said vertical operating magnet, a line relay, means for transmitting a plurality of impulses through said line relay to operate said vertical magnet to move said switch in a vertical plane, a third relay having an energizing circuit controlled by said slow acting relay, means for locking said third relay in position upon energization, means for deenergizing said slow acting relay after said impulses have been transmitted, and an energizing circuit for said rotary operating magnet adapted to be closed upon the energization of said third relay and the deenergization of said slow acting relay.

24. In a telephone system, a vertical and rotary motion switch, a vertical operating magnet, a rotary operating magnet, a slow acting relay connected in series with said vertical operating magnet, a line relay, means for transmitting a plurality of impulses through said line relay to operate said vertical magnet to move said switch in a vertical plane, a third relay having an energizing circuit controlled by said slow acting relay, means for locking said third relay in position upon energization, means for deënergizing said slow acting relay after said impulses have been transmitted, an energizing circuit for said rotary operating magnet adapted to be closed upon the energization of said third relay and the deënergization of said slow acting relay, and means for automatically interrupting the flow of current through said energizing circuit for said rotary magnet.

25. In a telephone system, a switch having vertical and rotary motions, a line relay for controlling said switch, an operating magnet controlling the rotary motion of said switch, an energizing circuit for said magnet, a pair of relays controlling said energizing circuit, one of said relays adapted to be energized in order to energize the second of said relays, means for closing said energizing circuit for said operating magnet by having said second relay energized while said first relay is deënergized, and means for controlling the operation of said switch over two sides of the line circuit in series.

26. In a telephone system, a line, a switch with a wiper having vertical and rotary motion, a vertical operating magnet, a rotary operating magnet, a slow acting relay connected in series with said vertical operating magnet, a second relay controlled by said slow acting relay, means for closing the energizing circuit for said rotary operating magnet by first energizing said relays and then deënergizing said slow acting relay, means for automatically interrupting the circuit of said rotary operating magnet, a switching relay for connecting said line with said wiper, and means for controlling the operation of said selector over two sides of the line circuit in series.

27. In a telephone system, a vertical and rotary motion switch, a vertical operating magnet, a rotary operating magnet, a slow acting relay connected in series with said vertical operating magnet, a line relay, means for transmitting a plurality of impulses through said line relay to operate said vertical magnet to move said switch in a vertical plane, a third relay having an energizing circuit controlled by said slow acting relay, means for locking said third relay in position upon energization, means for deënergizing said slow acting relay after said impulses have been transmitted, an energizing circuit for said rotary operating magnet adapted to be closed upon the energization of said third relay and the deënergization of said slow acting relay, and means for controlling the operation of said switch over two sides of the line circuit in series.

28. In a telephone system, a vertical and rotary motion switch, a vertical operating magnet, a rotary operating magnet, a slow acting relay connected in series with said vertical operating magnet, a line relay, means for transmitting a plurality of impulses through said line relay to operate said vertical magnet to move said switch in a vertical plane, a third relay having an energizing circuit controlled by said slow acting relay, means for locking said third relay in position upon energization, means for deënergizing said slow acting relay after said impulses have been transmitted, an energizing circuit for said rotary operating magnet adapted to be closed upon the energization of said third relay and the deënergization of said slow acting relay, means for automatically interrupting the flow of current through said energizing circuit for said rotary magnet, and means for controlling the operation of said switch over two sides of the line circuit in series.

29. In a telephone system, an automatic switch for use in establishing a talking circuit, a relay for controlling the connection of said switch with the conductors of said circuit, an energizing circuit for said relay normally open at one point, means for closing said normally open contact point upon the initial movement of said switch, and means for maintaining said circuit open at a second point until said switch has completed its operation.

30. In a telephone system, an automatic switch for use in establishing a talking circuit, a relay for controlling the connection of said switch with the conductors of said talking circuit, an energizing circuit for said relay including contacts normally maintained open while said switch is in normal position and adapted to be closed by the initial movement of said switch, normally closed contact points adapted to be opened upon such movement, and means for again closing said second-mentioned contact points when said switch has completed its operation, whereby said relay is energizing and said switch disconnected from the conductors of said talking circuit.

31. In a telephone system, an automatic switch for use in establishing a talking circuit, a relay controlling the connection of said switch with the conductors of said circuit, an energizing circuit for said relay including normally open contacts adapted to be closed upon the first movement of said switch, a relay, means for operating said relay upon the receipt of the first operating impulse to open said energizing circuit at a second point, and means for maintaining said relay energized until after said switch has completed its operation.

32. In a telephone system, an automatic switch for use in establishing a talking circuit, a relay for controlling the connection of said switch with the conductors of said circuit, an energizing circuit for said relay normally open at one point, means for closing said normally open contact point upon the initial movement of said switch, means for maintaining said circuit open at a second point until said switch has completed its operation, and means for controlling the operation of said switch over the two sides of the line circuit in series.

33. In a telephone system, an automatic switch for use in establishing a talking circuit, a relay for controlling the connection of said switch with the conductors of said talking circuit, an energizing circuit for said relay including contacts normally maintained open while said switch is in normal position and adapted to be closed by the initial movement of said switch, normally closed contact points adapted to be opened upon such movement, means for again closing said second-mentioned contact points when said switch has completed its operation, whereby said relay is energized and said switch disconnected from the conductors of said talking circuit, and means for controlling the operation of said switch over two sides of the line circuit in series.

34. In a telephone system, an automatic switch for use in establishing a talking circuit, a relay controlling the connection of said switch with the conductors of said circuit, an energizing circuit for said relay, including normally open contacts adapted to be closed upon the first movement of said switch, a relay, means for operating said relay upon the receipt of the first operating impulse to open said energizing circuit at a second point, means for maintaining said relay energized until after said switch has completed its operation, and means for controlling the operation of said switch over the two sides of the line circuit in series.

35. In a telephone system, means for establishing a calling connection, a slow-acting relay, means for keeping said relay energized continuously by intermittent current before the connection is completed, means for deënergizing said relay before the call is answered, a release magnet controlled by said slow-acting relay, a quick-acting relay energized during conversation to prevent operation of said release magnet when said slow relay deënergizes, and means for deenergizing said quick relay to effect the release independently of the slow relay.

36. In a telephone system, a switch, a release magnet, a circuit therefor, quick and slow acting relays controlling said circuit, means for keeping the slow relay energized during some portion of the call to prevent a premature release, and means for keeping the slow relay deënergized and the quick relay energized during conversation, to keep the said circuit open and permit a quick release when the subscribers are through talking.

37. In a telephone system, a selector provided with a release magnet, and having quick and slow acting relays controlling the said magnet, the quick acting relay holding circuit open through said magnet during conversation, and the slow acting relay holding said circuit open while operating impulses are being transmitted.

38. In a telephone system, a switch, means including a release magnet and a release magnet circuit for releasing the same, a slow-acting relay controlling the release magnet circuit during the operation of the switch, and a quick-acting relay controlling the release magnet circuit independently of said slow-acting relay after the switch has operated.

39. In a telephone system, a switch provided with a release magnet, and slow and quick relays for successively controlling said magnet, the slow relay while the switch is operating, and the quick relay after operation thereof, either relay being energized while the other is deënergized, while the switch is in operation or use, but both relays being normally deënergized.

40. In a telephone system, a pair of lines, a pair of automatic progressively movable switches operable successively for trunking from one line to another for setting up a connection between said lines, release means for breaking the connection at each switch, quick relays and slow relays in the system for controlling said release means, and means controlled solely through the medium of said quick-acting relays for operating said release means to break the connection.

41. In a telephone system, a switch, a line circuit, means for controlling the two sides of said circuit in series to operate said switch, a release magnet for said switch, a slow relay for preventing operation of said magnet during the operation of the switch, a quick relay for preventing a release during conversation over said circuit, either relay adapted to operate the release magnet when the line circuit is opened by the hanging up of the receiver, but the slow relay remaining energized during control of the circuit to operate the switch, and after operation of the switch the release being independent of the slow relay and under the control of the quick relay.

42. In a telephone system, a line, means controlled over the two sides of the line in series for establishing a calling connection, a slow acting relay, said means for keeping said relay energized continuously by intermittent current before the call is completed, and for deënergizing said relay before the call is answered, said means comprising an electromagnetic releasing device controlled by said slow-acting relay, said means also for removing said releasing device from the control of the slow relay while the connection is established and until after it is released, said means including a quick acting relay energized during conversation to prevent operation of said releasing device, and means for deënergizing said quick relay to effect the release.

43. In a telephone system, a line, means controlled over the two sides of the line in series for establishing a connection, a release magnet, a circuit therefor, quick and slow acting relays controlling said circuit, means for keeping the slow relay energized during some portion of the call to prevent a premature release, and means for keeping the slow relay deënergized and the quick relay energized during conversation, to keep the said circuit open and permit a quick release when the subscribers are through talking.

44. In a telephone system, a selector provided with a release magnet, a line relay controlled over two sides of a calling line in series for operating the said selector, said selector having quick and slow acting relays controlling the said magnet, the quick acting relay while energized holding circuit open through said magnet during conversation, and means for holding said quick acting relay energized.

45. In a telephone system, a switch, means for releasing the same including a relay slow to release controlling a release magnet during the operation of the switch, and a quick-acting relay controlling the release independently of said slow relay after the switch has operated, and means for controlling the two sides of a calling line in series to operate said switch.

46. In a telephone system, a trunk, a switch for extending connection thereto, releasing means for said switch including a slow-acting relay controlling the release before connection is extended to the trunk, and a quick acting relay controlled over the trunk for controlling the release after the switch has established the connection, and means for controlling the two sides of a calling line in series to operate said switch.

47. In a telephone system, a trunk, a switch for extending connection therefrom, releasing means for said switch including a release magnet and a relay slow to release its armature, said relay controlling the release magnet while the switch is operating, a quick-acting relay controlling the release magnet independently of said slow relay after connection has been established from the trunk, and means for controlling the two sides of a calling line in series to operate said switch.

48. In a telephone system, means for establishing a calling connection, a slow-acting relay, said means for keeping said relay energized continuously by intermittent current before the call is completed, and for deënergizing said relay before the call is answered, said means comprising electromagnetic releasing device controlled by said slow-acting relay, a quick-acting relay energized during conversation to prevent operation of said device, said means also for removing said releasing device from the control of the slow relay while the call is established and until after it is released, and for deënergizing said quick relay to effect the release, and a central source of talking and operating current for said system.

49. In a telephone system, a release magnet, a circuit therefor, quick and slow acting relays controlling said circuit, means for keeping the slow relay energized during some portion of the call to prevent a premature release, means for keeping the slow relay deënergized and the quick relay energized during conversation, to keep the said circuit open and permit a quick release when the subscribers are through talking, and a central source of talking and operating current for said system.

50. In a telephone system, a selector provided with a line relay for controlling the operation of said selector, a release magnet, quick and slow acting relays for controlling the circuit of said magnet to prevent a premature release, and a central source of talking and operating current for said system, said quick relay when energized operating to open the circuit of the release magnet.

51. In a telephone system, a switch, means for releasing the same including a release magnet and a relay slow to release its armature, said relay controlling the release magnet during the operation of the switch, a quick-acting relay controlling the release magnet after the switch has operated independently of said slow relay, and a central source of talking and operating current for said system.

52. In a telephone system, a trunk, a switch for extending connection thereto, releasing means for said switch including a relay slow to release its armature, said relay controlling the release before connection is extended to the trunk, a quick-acting relay controlled over said trunk for controlling the release after the switch has established the connection, and a central source of talking and operating current for said system.

53. In a telephone system, a trunk, a switch for extending connection therefrom, releasing means for said switch including a release magnet and a relay slow to release its armature, said relay controlling the release magnet while the switch is operating, a quick-acting relay controlling the release magnet after connection has been established from the trunk independently of said slow relay, and a central source of talking and operating current for said system.

54. In a telephone system, an automatic switch having bank terminals divided into groups, the groups being disposed in parallel planes, movable arms having motion in one direction to find a group and motion in another direction to find a terminal in the selected group, a line relay for controlling the operation of said arms connected to a trunk, an electromagnet for connecting said trunk with said arms by a single movement of its armature, and means for controlling the two sides of said trunk in series, said relay also for disconnecting said line relay from said trunk.

55. In a telephone system, an automatic switch having bank terminals divided into groups, the groups being disposed in parallel planes, movable arms having motion in one direction to find a group and motion in another direction to find a terminal in the selected group, a line relay for controlling the operation of said arms, a trunk, an electromagnet for connecting said trunk with said arms by a single movement of its armature, means for controlling said switch over the two sides of said trunk in series, a third arm, release mechanism for said switch, and release circuits therefor including contacts of said bank and said third arm.

56. In a telephone system, an automatic switch having bank terminals divided into groups, the groups being disposed in parallel planes, movable arms having motion in one direction to find a group and motion in another direction to find a terminal in the selected group, an electromagnet for producing the first motion, an electromagnet for producing the second motion, a line, a relay for connecting said line with said arms by a single movement of its armature, means for controlling said switch over the two sides of said line in series, a third arm, release mechanism for said switch, and release circuits therefor including contacts of said bank and said third arm.

57. In a telephone system, an automatic switch having bank terminals divided into groups, the groups being disposed in parallel planes, movable arms having motion in one direction to find a group and motion in another direction to find a terminal in the selected group, electromagnet mechanism for producing said first and second motions, a relay, a trunk normally disconnected from said arms, adapted by a single movement of the armature of said relay to connect with said arms, means for controlling said switch over the two sides of said trunk in series, a third arm, release mechanism for said switch, and release circuits therefor including contacts of said bank and said third arm.

58. In a telephone system, an automatic switch having bank terminals divided into groups, the groups being disposed in parallel planes, movable arms having motion in one direction to find a group and motion in another direction to find a terminal in the selected group, a line relay for controlling the operation of said arms connected to a trunk, an electromagnet for connecting said trunk with said arms by a single movement of its armature, and for disconnecting said line relay from said trunk, means for controlling said switch over the two sides of said trunk in series, a central source of operating current for said switch, and a substation telephone deriving talking current from said source.

59. In a telephone system, an automatic switch having bank terminals divided into groups, the groups being disposed in parallel planes, movable arms having motion in one direction to find a group and motion in another direction to find a terminal in the selected group, an electromagnet for producing the first motion, an electromagnet for producing the second motion, a line relay for controlling the operation of said magnets connected to a line, a relay for connecting said line with said arms by a single movement of its armature and also for disconnecting said line relay from said line, means for controlling said switch over the two sides of said line in series, a central source of operating current for said switch, and a substation telephone deriving talking current from said source.

60. In a telephone system, an automatic switch having bank terminals divided into groups, the groups being disposed in parallel planes, movable arms having motion in one direction to find a group and motion in another direction to find a terminal in the selected group, a line relay for controlling the operation of said arms, an electromagnet, a trunk adapted by a single movement of the armature of said magnet to connect with said arms, means for controlling said switch over the two sides of said trunk in series, and mechanism operative under substation control to find the called subscriber's line.

61. In a telephone system, an automatic switch having bank terminals divided into groups, the groups being disposed in parallel planes, movable arms having motion in one direction to find a group and motion in another direction to find a terminal in the selected group, an electromagnet for producing the first motion, an electromagnet for producing the second motion, a relay, a line adapted by a single movement of the armature of said relay to connect with said arms, means for controlling said switch over two sides of said line in series, and mechanism operative under substation control to find the called subscriber's line.

62. In a telephone system, an automatic switch having bank terminals divided into groups, the groups being disposed in parallel planes, movable arms having motion in one direction to find a group and motion in another direction to find a terminal in the selected group, electromagnet mechanism for producing said first and second motions, a relay, a trunk normally disconnected from said arms, adapted by a single movement of the armature of said relay to connect with said arms, means for controlling said switch over the two sides of said trunk in series, and mechanism operative under substation control to find the called subscriber's line.

63. In a telephone system, an automatic switch, means including a selector for extending a talking circuit connection to said automatic switch, said selector being provided with a release magnet, and quick and slow acting relays for controlling said magnet, the quick acting relay being controlled from said automatic switch for holding the circuit open through said magnet during conversation, said slow relay disconnected from the talking circuit.

64. In a telephone system, a trunk, a switch for extending connection thereto, releasing means for said switch including a relay slow to release its armature, said relay controlling the release while the switch is operating, and a quick acting relay controlled over said trunk for controlling the release of said switch after connection has been established with said trunk.

65. In a telephone system, means including switches having selecting motions in two intersecting planes for establishing a calling connection, means for releasing the connection including release magnets, circuits for energizing said magnets, slow acting relays controlling the release circuits during the establishment of the call, and quick acting relays for controlling the release circuits during conversation independently of said slow acting relays.

66. In a telephone system, means for establishing a call, means for releasing the call including a release magnet and relays slow to release their armatures, said relays controlling the release magnet during the establishment of the call, quick acting relays for controlling the release magnet during conversation independently of said slow acting relays, and a central source of talking and operating current for said system.

67. In a telephone system, means including a connector for establishing a connection, means including a relay in said connector for establishing a guarding potential for said connection, release means, one or more slow acting relays which control the release before the called line is found, and one or more quick acting relays which control the release after the connection is established subject to control by the connector relay whereby the release after conversation is simultaneous with the removal of the guarding potential by the deënergizing of said connector relay.

68. In a telephone system, an automatic progressively movable switch provided with a release magnet, a line relay controlled over the two sides of a calling line in series for operating the said switch, quick and slow-acting relays controlling said magnet, the quick acting relay when energized holding the circuit open through said magnet during conversation, and means for holding said quick acting relay energized.

69. In a telephone system, an automatic progressively movable switch provided with a line relay for controlling the operation of said switch, a release magnet, quick and slow acting relays controlling the circuit of said magnet to prevent a premature release, said quick relay when energized holding open the circuit of the release magnet, and a central source of talking and operating current for said system.

Signed by me at Chicago, Cook county Illinois, this 20th day of August, 1918.

TALBOT G. MARTIN.

Copies of this patent may be obtained for five cents each, by addressing the "Commissioner of Patents, Washington, D. C."

No references cited.

DISCLAIMER.

14,665. (Reissue.)—*Talbot G. Martin*, Chicago, Ill. AUTOMATIC TELEPHONE SWITCHING APPARATUS. Patent dated June 10, 1919. Disclaimer filed June 30, 1920, by the patentee, the assignee, *Automatic Electric Company*, consenting.

Enters this disclaimer—

"To claims 38, 40, 45, 46, 47, 51, 52, 53, 64, 65, 66, in said specification, which are in the following words:

"38. In a telephone system, a switch, means including a release magnet and a release magnet circuit for releasing the same, a slow-acting relay controlling the release magnet circuit during the operation of the switch, and a quick-acting relay controlling the release magnet circuit independently of said slow-acting relay after the switch has operated.

"40. In a telephone system, a pair of lines, a pair of automatic progressively movable switches operable successively for trunking from one line to another for setting up a connection between said lines, release means for breaking the connection at each switch, quick relays and slow relays in the system for controlling said release means, and means controlled solely through the medium of said quick-acting relays for operating said release means to break the connection.

"45. In a telephone system, a switch, means for releasing the same including a relay slow to release controlling a release magnet during the operation of the switch, and a quick-acting relay controlling the release independently of said slow relay after the switch has operated, and means for controlling the two sides of a calling line in series to operate said switch.

"46. In a telephone system, a trunk, a switch for extending connection thereto, releasing means for said switch including a slow-acting relay controlling the release before connection is extended to the trunk, and a quick acting relay controlled over the trunk for controlling the release after the switch has established the connection, and means for controlling the two sides of a calling line in series to operate said switch.

"47. In a telephone system, a trunk, a switch for extending connection therefrom, releasing means for said switch including a release magnet and a relay slow to release its armature, said relay controlling the release magnet while the switch is operating, a quick-acting relay controlling the release magnet independently of said slow relay after connection has been established from the trunk, and means for controlling the two sides of a calling line in series to operate said switch.

"51. In a telephone system, a switch, means for releasing the same including a release magnet and a relay slow to release its armature, said relay controlling the release magnet during the operation of the switch, a quick-acting relay controlling the release magnet after the switch has operated independently of said slow relay, and a central source of talking and operating current for said system.

"52. In a telephone system, a trunk, a switch for extending connection thereto, releasing means for said switch including a relay slow to release its armature, said relay controlling the release before connection is extended to the trunk, a quick-acting relay controlled over said trunk for controlling the release after the switch has established the connection, and a central source of talking and operating current for said system.

"53. In a telephone system, a trunk, a switch for extending connection therefrom, releasing means for said switch including a release magnet and a relay slow to release its armature, said relay controlling the release magnet while the switch is operating, a quick-acting relay controlling the release magnet after connection has been established from the trunk independently of said slow relay, and a central source of talking and operating current for said system.

"64. In a telephone system, a trunk, a switch for extending connection thereto, releasing means for said switch including a relay slow to release its armature, said relay controlling the release while the switch is operating, and a quick acting relay controlled over said trunk for controlling the release of said switch after connection has been established with said trunk.

"65. In a telephone system, means including switches having selecting motions in two intersecting planes for establishing a calling connection, means for releasing the connection including release magnets, circuits for energizing said magnets, slow acting relays controlling the release circuits during the establishment of the call, and quick acting relays for controlling the release circuits during conversation independently of said slow acting relays.

"66. In a telephone system, means for establishing a call, means for releasing the call including a release magnet and relays slow to release their armatures, said relays controlling the release magnet during the establishment of the call, quick acting relays for controlling the release magnet during conversation independently of said slow acting relays, and a central source of talking and operating current for said system."

[*Official Gazette July 13, 1920.*]

DISCLAIMER.

14,665. (Reissue.)—*Talbot G. Martin*, Chicago, Ill. AUTOMATIC TELEPHONE SWITCHING APPARATUS. Patent dated June 10, 1919. Disclaimer filed February 28, 1921, by the patentee, the assignee, *Automatic Electric Company*, consenting.

Enters this disclaimer—

"To claims 60 and 61 in said specification, which are in the following words, to wit:

"60. In a telephone system, an automatic switch having bank terminals divided into groups, the groups being disposed in parallel planes, movable arms having motion in one direction to find a group and motion in another direction to find a terminal in the selected group, a line relay for controlling the operation of said arms, an electromagnet, a trunk adapted by a single movement of the armature of said magnet to connect with said arms, means for controlling said switch over the two sides of said trunk in series, and mechanism operative under substation control to find the called subscriber's line.

"61. In a telephone system, an automatic switch having bank terminals divided into groups, the groups being disposed in parallel planes, movable arms having motion in one direction to find a group and motion in another direction to find a terminal in the selected group, an electromagnet for producing the first motion, an electromagnet for producing the second motion, a relay, a line adapted by a single movement of the armature of said relay to connect with said arms, means for controlling said switch over two sides of said line in series, and mechanism operative under substation control to find the called subscriber's line."

[*Official Gazette March 22, 1921.*]

179-18

DISCLAIMER IN REISSUE LETTERS PATENT 14,665